United States Patent
Honkomp et al.

(10) Patent No.: US 7,168,921 B2
(45) Date of Patent: Jan. 30, 2007

(54) COOLING SYSTEM FOR AN AIRFOIL

(75) Inventors: Mark Steven Honkomp, Taylors, SC (US); Jeffrey John Butkiewicz, Simpsonville, SC (US); Philip Richard Hirt, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 140 days.

(21) Appl. No.: 10/990,961

(22) Filed: Nov. 18, 2004

(65) Prior Publication Data

US 2006/0104813 A1    May 18, 2006

(51) Int. Cl.
*F01D 5/18* (2006.01)
(52) U.S. Cl. .................. 416/96 R; 416/241 B
(58) Field of Classification Search .................. 416/92, 416/90 R, 96 A, 96 R, 97 R, 241 B
See application file for complete search history.

(56) References Cited

U.S. PATENT DOCUMENTS

| 5,246,340 A | * | 9/1993 | Winstanley et al. | ...... 416/97 R |
| 6,224,337 B1 | * | 5/2001 | Lieland et al. | ............ 416/97 R |
| 6,461,108 B1 | * | 10/2002 | Lee et al. | ................. 416/96 R |

* cited by examiner

*Primary Examiner*—Richard A. Edgar
(74) *Attorney, Agent, or Firm*—Nixon & Vanderhye P.C.

(57) ABSTRACT

The cooling system for the airfoil includes forward and aft cooling circuits supplied with a cooling medium. Both circuits include serpentine passages. A central rib divides the forward and aft cooling circuits and includes an opening adjacent the airfoil tip providing a jet of the cooling medium from the forward cooling circuit for impingement against the aft portion of the tip cap. The tip cap also includes a thermal barrier coating along an outside surface thereof as well as on the seat for the tip cap, thereby lowering the tip cap metal temperature and thermally induced stress.

12 Claims, 4 Drawing Sheets

COOLING SYSTEM FOR AN AIRFOIL

TECHNICAL FIELD

The present invention relates to a bucket for a turbine and particularly relates to a cooling system for an airfoil, and specifically the airfoil tip.

BACKGROUND AND BRIEF DESCRIPTION OF THE INVENTION

With increased gas firing temperatures in modern day gas turbines, various portions along the hot gas path of the turbine are exposed to a higher heat load environment. One area that has exhibited marked increase in heat load is the tip of the airfoil on the gas turbine rotor. Excessive heat loads have resulted in airfoil tip cap oxidation and creep distress. While thicker and different materials less subject to oxidation and creep properties have been substituted for prior airfoil tip cap designs, it has been demonstrated that unacceptable tip cap stress levels may increase notwithstanding these thicker and different materials. Accordingly, there is a demonstrated need for a cooling system for the airfoil tip cap of a turbine bucket which will lower the tip cap metal temperature and thermally-induced stresses and particularly without increasing the total turbine cooling flow.

In a preferred embodiment of the present invention, there is provided a bucket for a gas turbine having an airfoil, a shank and a platform between the shank and the airfoil. The airfoil includes a cooling circuit having a plurality of passages for flowing a cooling medium within the airfoil and at least one rib extending between opposite sides of the airfoil dividing the cooling circuit into a forward cooling circuit and an aft cooling circuit. The airfoil also includes an airfoil tip having an opening and a tip cap secured to the airfoil closing the opening. The rib includes a hole for flowing a portion of the cooling medium toward the tip cap to impingement cool the tip cap.

In a further preferred embodiment of the invention, there is provided a bucket for a gas turbine having an airfoil, a shank and a platform between the shank and the airfoil, the airfoil including a cooling circuit having a plurality of passages for flowing a cooling medium within the airfoil. The airfoil includes a tip having an opening and a tip cap secured to the airfoil closing the opening. The tip cap has a thermal barrier coating along an outside surface thereof. Preferably, the airfoil has a seat adjacent the airfoil tip for receiving the tip cap and which seat also has a thermal barrier coating.

DETAILED DESCRIPTION OF THE INVENTION

Figure 1:
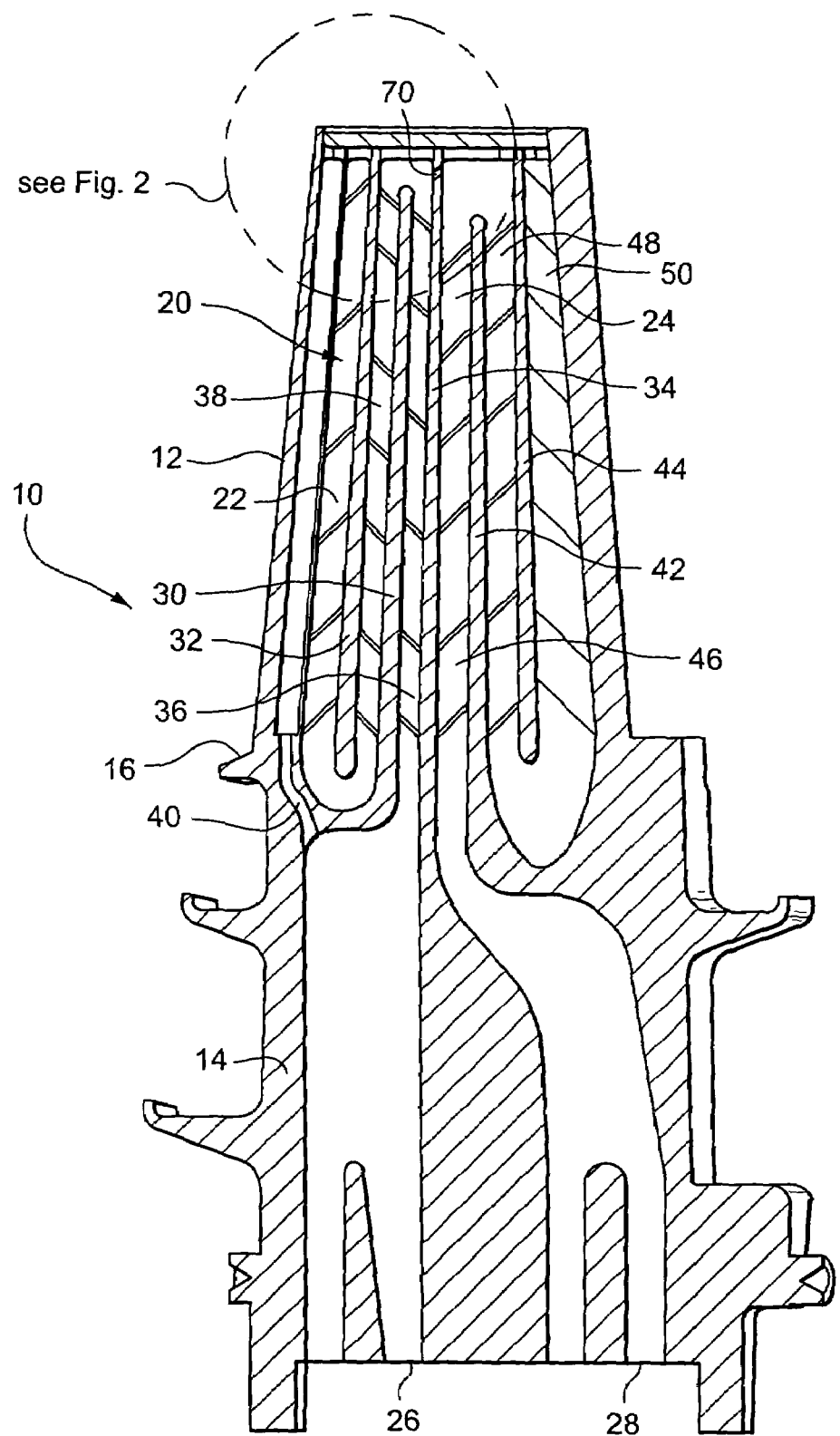
FIG. 1 is a schematic cross-sectional view of a bucket for a gas turbine illustrating a cooling system therefor in accordance with a preferred aspect of the present invention.

Referring now to FIG. 1, there is illustrated a bucket, generally designated 10, for a gas turbine rotor, not shown, including an airfoil 12, a shank 14 and a platform 16 between the shank 14 and the airfoil 12. As illustrated in FIG. 1, the bucket 12 includes a cooling circuit, generally designated 20, having a plurality of passages for flowing a cooling medium, for example, air, within the airfoil. Particularly, it will be appreciated that cooling air, for example, compressor discharge air, may be supplied to the airfoil cooling circuit 20, the cooling circuit 20 including a forward cooling circuit 22 and an aft cooling circuit 24. Inlets 26 and 28, respectively, adjacent the base of the shank 14 each provide a pair of inlet ports as illustrated for flowing a cooling medium, preferably compressor discharge air, into the respective forward and aft cooling circuits 22 and 24.

The forward cooling circuit 22 includes a plurality of generally serpentine configured passages formed by ribs 30 and 32 and in part by a central rib 34, the ribs extending between opposite sides of the airfoil. Thus, the cooling medium, e.g., compressor discharge air, flows through inlet 26 into passage 36 in a generally radially outward direction between ribs 30 and 34, reverses direction adjacent the tip of the airfoil for flow in a general radially inward direction via passage 38 between ribs 30 and 32 and turns in a direction generally radially outwardly for flow through a series of film cooling holes 39 (FIG. 3) spaced along the leading edge. A supplemental passageway 40 also supplies the cooling medium directly to the leading edge film cooling holes 39.

The aft cooling circuit 24 includes a pair of ribs 42 and 44 extending between opposite sides of the airfoil. Thus, the cooling medium flows through the inlet 28 in a generally radially outward direction through passage 46 between the central rib 34 and rib 42, reverses direction adjacent the tip of the airfoil for flow through passage 48 in a generally radially inward direction and finally flows in a radially outward direction via passage 50 between rib 44 and the trailing edge. A wall, not shown, in passage 50 and along the trailing edge, contains perforations for flowing the cooling medium through trailing edge cooling holes 52 (FIG. 3).

Figure 3:
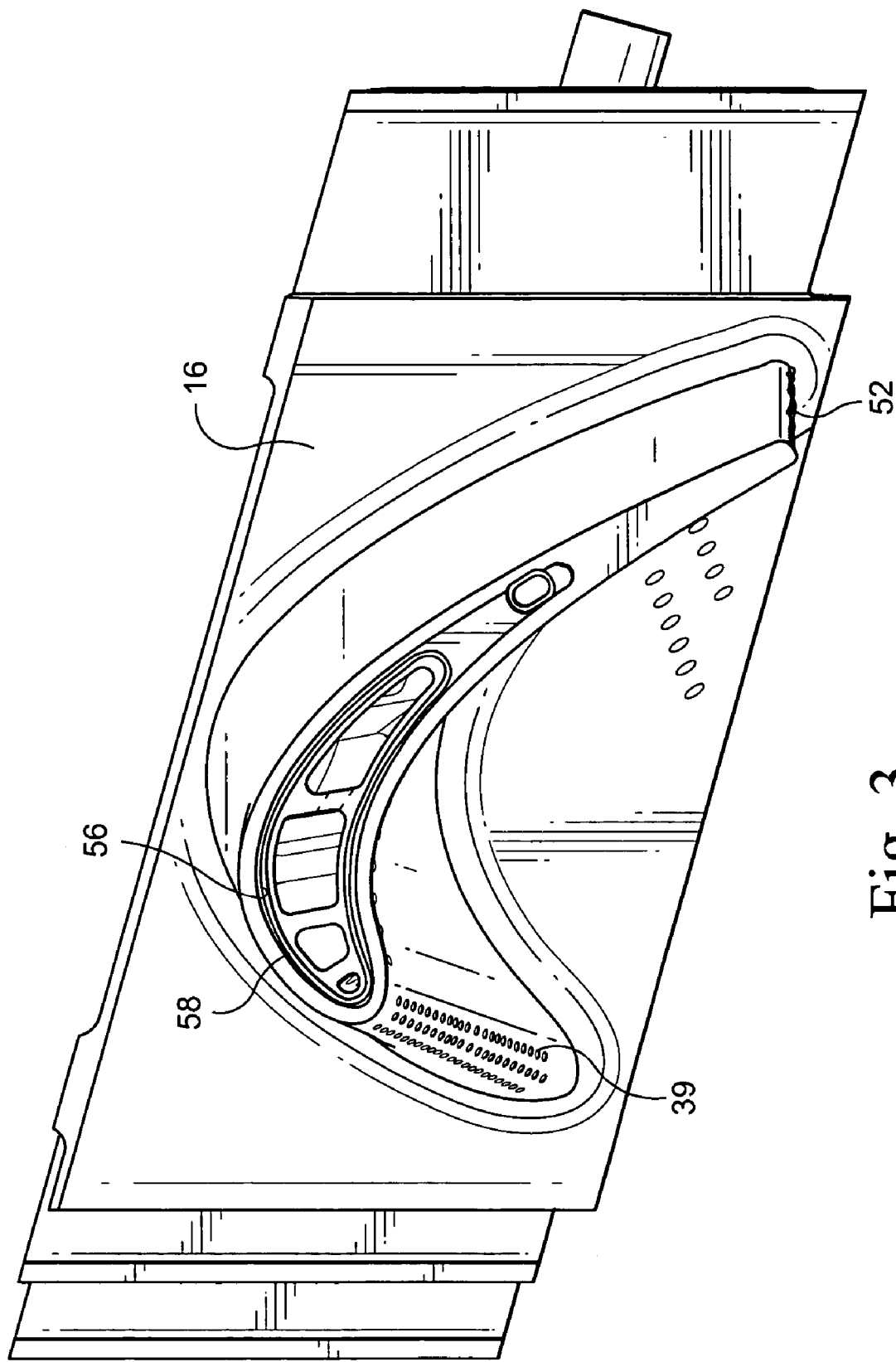
FIG. 3 is an end view of the airfoil looking generally radially inwardly.
Figure 4:
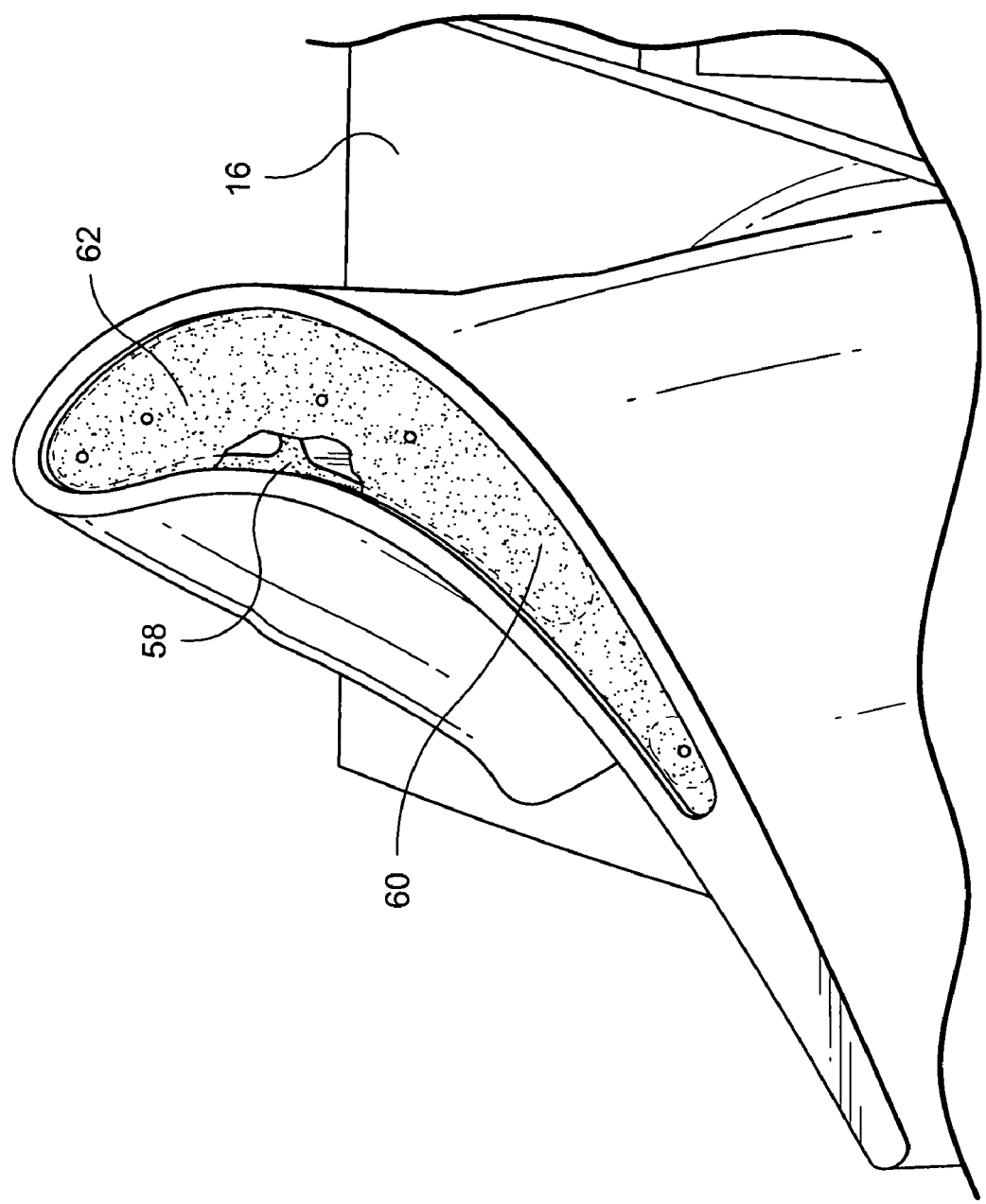
FIG. 4 is a fragmentary perspective view of a tip cap installed on the tip of the airfoil.

Referring to FIG. 3, the airfoil tip is provided with an opening 56 defined by a recessed seat 58. A tip cap 60 (FIG. 4) is disposed in the opening 56 on seat 58. The tip cap 60 is suitably secured to the airfoil tip on seat 58 closing the opening 56. Tip cap 60 may, however, have small openings therethrough to discharge a small portion of the cooling medium into the hot gas path, e.g., to exhaust particulate matter into the hot gas path. As noted previously, it is desirable to lower the tip cap metal temperature and thermally induced stresses in the tip cap without drawing off additional cooling air from the total engine flow.

To in part achieve that objective, the radially outer face of tip cap 60 is provided with a vacuum plasma spray bond coat and a thermal barrier coating (TBC) 62. The bond coat and the thermal barrier coating may comprise an oxidation resistant alloy such as MCrALY and zirconia partially stabilized with yittria, respectively, as set forth in U.S. Pat. No. 6,730,413, the subject matter of which is incorporated herein by reference. Other types of bond and TBC coatings may be used. Additionally, the seat 58, i.e., the margin of the opening 56, is likewise provided with the bond coat and thermal barrier coating. These layers protect the tip cap from the elevated temperatures of the hot gas flowing in the gas path.

Figure 2:
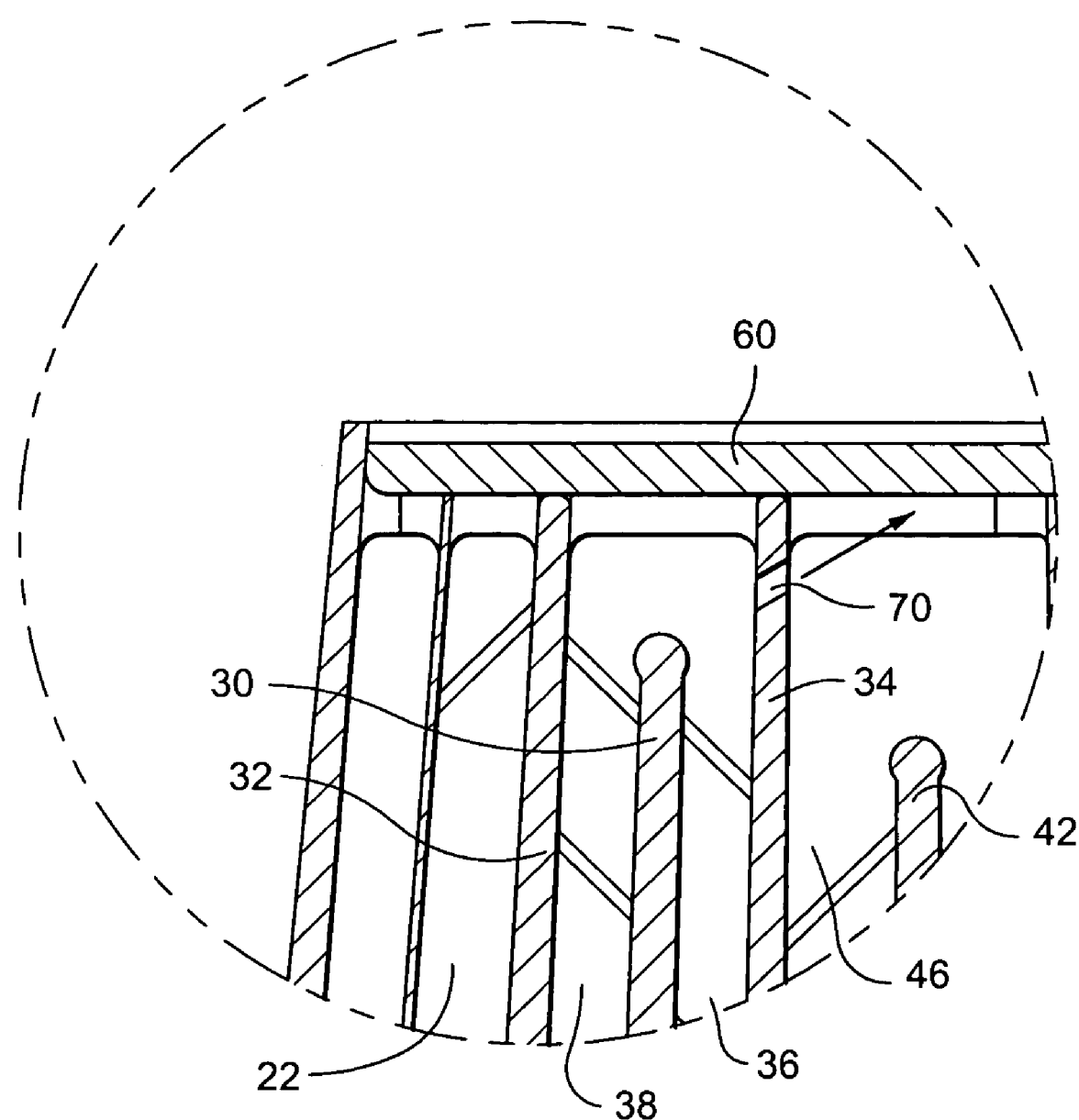
FIG. 2 is an enlarged cross-sectional view of a tip portion of the airfoil of FIG. 1.

Further, the cooling circuit 20 hereof provides for active cooling of the underside of the tip cap 60. Particularly, cooling air is bled from the forward circuit for flow through a hole for impingement cooling of the tip cap 60. As illustrated in FIGS. 1 and 2, the central rib 34 is provided with a hole 70 adjacent the airfoil tip and immediately below the tip cap 60. The hole 70 is angled in a radially outward direction toward the aft portion of the tip cap. The aft portion of the tip cap constitutes the hottest portion of the tip cap. Thus, a jet of impingement cooling air from the forward cooling circuit 22 is directed through hole 70 onto the underside of the aft portion of the tip cap 60. By judicious choice of the size of the inlets 26 and 28, a pressure drop is created in the aft coating circuit 24 with respect to the forward cooling circuit 22 such that the impingement hole 70 through rib 34 separating the forward and aft cooling flow circuits has sufficient jet potential to effect impingement cooling of the tip cap 60. Metering plates, not shown, used in the inlets 26 and 28 are also sized such that total bucket cooling flow remains the same as in prior designs while simultaneously more cooling air is directed to the aft cooling circuit. Consequently, the combined cooling effect of the impingement jet cooling flow through hole 70 together with the TBC coating 62 on the external surface of the tip cap 60 and the seat 58 for the tip cap 60, reduces both the tip cap metal temperature and thermally induced stress.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A bucket for a gas turbine comprising:
   an airfoil, a shank and a platform between the shank and the airfoil;
   said airfoil including a cooling circuit having a plurality of passages for flowing a cooling medium within the airfoil;
   at least one rib extending between opposite sides of said airfoil dividing the cooling circuit into a forward cooling circuit and an aft cooling circuit each cooling circuit having a discrete inlet for the cooling medium;
   said airfoil including an airfoil tip having an opening;
   a tip cap secured to said airfoil closing said opening;
   said rib having a hole for flowing a portion of the cooling medium from said forward cooling circuit to said aft cooling circuit, said hole angled to direct the cooling medium toward said tip cap to impingement cool said tip cap.

2. A bucket according to claim 1 wherein each of said forward and aft cooling circuits includes a plurality of serpentine passages defined in part by said rib.

3. A bucket according to claim 1 wherein said airfoil includes film-cooling holes along a leading edge portion of the airfoil for flowing air from said forward cooling circuit and through said film-cooling holes to film cool the airfoil.

4. A bucket according to claim 3 wherein said airfoil includes a plurality of openings through the trailing edge in communication with the aft cooling circuit for cooling the trailing edge.

5. A bucket according to claim 1 wherein said cap has a thermal barrier coating along an outside surface thereof.

6. A bucket according to claim 1 wherein said airfoil tip includes a recessed seat for receiving said cap, said seat having a thermal barrier coating.

7. A bucket according to claim 1 wherein said airfoil tip includes a recessed seat for receiving said tip cap, said seat having a thermal barrier coating, said tip cap having a thermal barrier coating along an outside surface thereof.

8. A bucket for a gas turbine comprising:
   an airfoil, a shank and a platform between the shank and the airfoil;
   said airfoil including a cooling circuit having a plurality of passages for flowing a cooling medium within the airfoil;
   said airfoil including a tip having an opening;
   a tip cap secured to said airfoil closing said opening;
   said tip cap having a thermal barrier coating along an outside surface thereof; and
   wherein said airfoil tip includes a recessed seat for receiving said tip cap, said seat having a thermal barrier coating thereon.

9. A bucket according to claim 8 wherein said airfoil includes film cooling holes along a leading edge portion of the airfoil for flowing air from said cooling circuit to film cool the airfoil.

10. A bucket according to claim 9 wherein said airfoil includes a plurality of openings through the trailing edge in communication with said cooling circuit for flowing air from said cooling circuit to film cool the trailing edge.

11. A bucket according to claim 10 wherein said thermal barrier coating is applied solely to said outside surface of said tip cap.

12. A bucket according to claim 8 wherein said thermal barrier coating is applied solely to said outside surface of said tip cap.

\* \* \* \* \*